Nov. 1, 1938.    A. C. SLADKY    2,135,225
PORTABLE CONTAINER
Filed Oct. 7, 1935
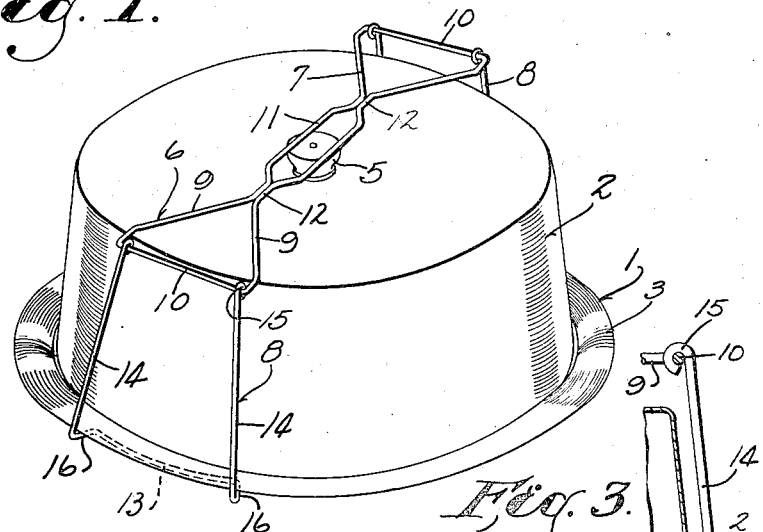
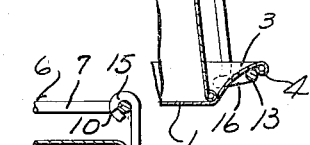
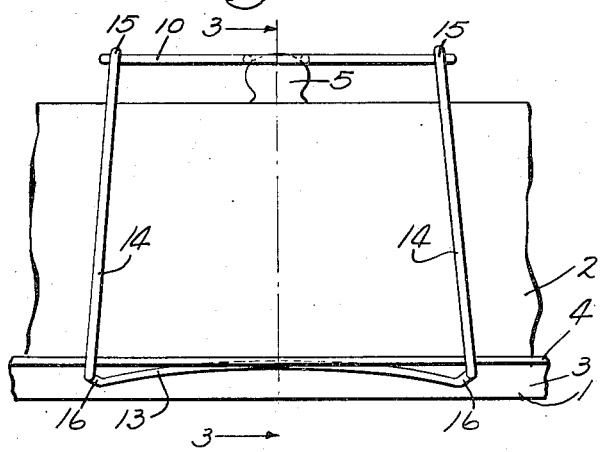
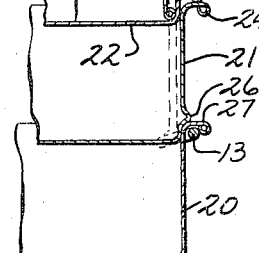
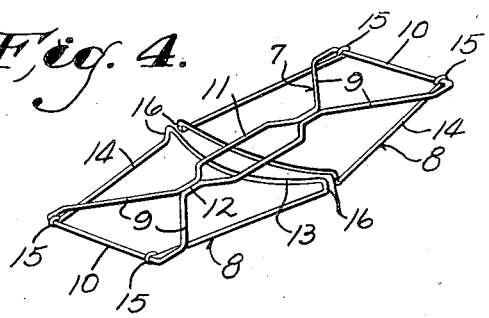
INVENTOR
Alexander C. Sladky
BY
Bottum, Hudnall, Lecher,
McNamara + Michael
ATTORNEYS Patented Nov. 1, 1938

2,135,225

UNITED STATES PATENT OFFICE 2,135,225

PORTABLE CONTAINER

Alexander C. Sladky, Milwaukee, Wis., assignor to Geuder Paeschke & Frey Co., Milwaukee, Wis., a corporation of Wisconsin Application October 7, 1935, Serial No. 43,826

6 Claims. (Cl. 220—55)

This invention relates to a portable food container such as a cake cover and tray or to a combination of cake cover and tray and pan-like receptacles designed to be stacked or superposed one on the other and conveniently employed for storing and handling foods of various kinds.

One of the objects of the present invention is to provide portable food containers of this character with a novel form of combined handle and clamp which may be conveniently applied to secure the several elements of the container together and affords means whereby the assembly may be conveniently handled.

One of the principal features of novelty of the invention resides in the fact that the combined handle and clamp is foldable and collapsible so that it may be compactly packaged for shipment and as conveniently stored away when not in use. The features which are employed to obtain the advantage of collapsibility or foldability also improve the action of the device when in use, especially in facilitating the application or removal thereof.

In carrying out the invention, the handle consists of a wire frame adapted to extend across the top of the cover, the intermediate portion of the frame bearing against the cover or against the knob thereof and the ends of the frame projecting slightly beyond the periphery of the cover. Pivotally suspended from the ends of the frame are hangers which have their lower ends formed with gripping portions. These hangers may be readily swung into engagement with the base or tray of the container and when so engaged the handle portion may be readily grasped to pick up and carry about the assembly.

Other objects and advantages reside in certain novel features of the construction, arrangement and combination of parts which will be hereinafter more fully described, and particularly pointed out in the appended claims, reference being had to the accompanying drawing forming a part of this specification, and in which:

Figure 1 is a perspective view showing a cake cover and tray provided with a combined handle and clamp embodying the present invention;

Figure 2 is a fragmentary view in elevation illustrating particularly the construction of the end hangers;

Figure 3 is a fragmentary sectional view taken on line 3—3 of Figure 2;

Figure 4 is a perspective view showing the combined handle and clamp folded up; and Figure 5 is a view similar to Figure 2 but showing the combined handle and clamp applied to a stack of receptacles.

Referring to the drawing, and more especially to Figures 1 to 4, inclusive, the numeral 1 designates a base or tray to which a cake cover 2 is applied. The lower edge of the cover 2 rests on the tray within the confines of its marginal flange 3. The outer periphery of this flange 3 may be formed with a rolled bead 4. To the center of the top of the cover 2 a knob 5 is attached.

The present invention proposes the provision of a combined handle and clamp designated generally at 6 and made up in the main of a handle member 7 and end hangers 8. The handle 7 may be advantageously constructed of wire which is bent in the form of an open frame having sides 9 and end members 10 extending between and connecting the ends of the sides 9. Intermediate their ends the side members 9 of the frame are contracted inwardly to provide a narrow central portion 11 which may be conveniently gripped and which is designed to bear against the knob 5. Adjacent this central portion 11 sections of the sides 9 of the wire frame are engaged as indicated at 12 and may be welded or soldered together. Instead of welding or soldering these portions 12 may be intertwisted. It is to be understood that if desired the frame 7 may be constructed of a piece of wire suitably bent in the manner shown and described and having its ends abutting and welded or soldered together. However, the frame may be constructed of a number of pieces of wire if so desired.

The hangers 8 each consist of a U-shaped piece of wire having an inwardly offset body portion 13 and legs 14. The upper ends of the legs 14 are provided with eyes 15 which embrace the end members 10 so as to pivotally suspend the hangers on the end members of the frame.

With this arrangement, the handle 7 may be conveniently positioned on the cover in the manner shown in Figure 1, that is, extending transversely or diametrically there-across with its narrowed portion 11 resting on the top of the knob 5. The hangers 8 may then be swung inwardly to engage the inwardly offset body portions 13 with the flange of the tray as shown in Figures 1, 2 and 3. In such position, the inwardly offset body portions 13 which constitute grippers snap behind the beads 4. It will be seen from the drawing that there are short connecting portions 16 between the lower ends of the legs 14 and the body portions 13. The parts are so dimensioned with respect to the cake cover and tray that in the assembly the frame 7 is flexed slightly to bring its inherent resiliency into action in securing the combined handle and clamp in position.

When the combined handle and clamp is removed, it may be compactly folded in the manner illustrated in Figure 4, that is, the hangers 8 may be brought into substantial parallelism with the handle 7 to provide a very compact structure.

In the form of the invention shown in Figure 5, a combined handle and clamp 6 of identical construction is provided although its dimensions may be varied. In Figure 5 the combined handle and clamp is applied to a stack of containers including a bottom receptacle or tray 20, a similar intermediate container 21, a tray 22 and a cover 23. The containers 20 and 21 and the tray 22 are provided with outwardly directed and beaded peripheral flanges designated at 24 and 25, and these parts interfit in the assembly as shown. In addition, the receptacle 20 has its peripheral wall formed with an outwardly directed corrugation 26 which bears on the flange 23 in the assembly. The handle member 7 extends across the cover as before and the hangers 8 depend along opposite peripheral portions of the assembly and have their grippers 13 engaged with the beaded flange 23.

While I have shown and described several structures in which the invention may be advantageously embodied, it is to be understood that these constructions have been selected merely for the purpose of illustration or example and that various changes in the size, shape and arrangement of the parts may be had without departing from the spirit of the invention or the scope of the subjoined claims.

The invention claimed is:

1. A portable food container comprising a base, removable cover means therefor, a resilient handle extending across and bearing upon the cover means, and hangers pivoted to the ends of the handle and having grippers at their lower ends engageable with the base, said handle flexing against its bearing upon said cover to maintain said grippers in engagement with said base.

2. A portable food container comprising a base, removable cover means therefor, a handle comprising a wire frame having side members and end members connecting the side members, and U-shaped hangers at the ends of the frame, each U-shaped hanger having the upper ends of its legs pivotally connected to the end members of the frame and having its body portion offset inwardly for engagement with said base.

3. A portable food container comprising a flanged tray, a cover therefor, a knob on the top of the cover, a handle comprising a wire frame having side members and end members connecting the side members, the frame being contracted laterally intermediate its ends so that portions of the side members are adapted to bear on said knob, and U-shaped hangers at the ends of the frame, each of said hangers having the upper ends of its legs connected to the frame and having its body portion offset inwardly to engage the flange of the tray.

4. A collapsible handle and clamp for use with a base and cover of a food container and comprising a flat wire frame having side members and end members connecting the side members, said frame being contracted laterally intermediate its ends and U-shaped hangers at the ends of the frame, each of said hangers having the upper ends of its legs pivotally interconnected with the end members of the frame and having its body portion offset inwardly to engage the flange of the tray, said hangers being foldable flatly against the frame and into substantial parallelism therewith when not in use.

5. A foldable handle and clamp for use with a base and cover of a food container and comprising a resilient elongated frame providing a handle and having a portion spaced from the ends thereof adapted to bear against the cover of a container, and end hangers pivoted to the ends of said frame and provided with gripping portions adapted to engage the under surface of the base of a food container, said hangers being flatly foldable against said frame when not in use, said frame flexing about said portion to keep said gripping portions in engagement with the base of a food container when in use.

6. A clamp for use with a base and cover of a food container comprising a resilient elongated stiff wire frame forming a closed substantially horizontally planar loop, said loop having spaced parallel end portions and a center portion adapted to bear against a portion of the cover, and end hangers pivotally secured to said end portions and having downwardly extending leg portions terminating in turned in portions adapted to releasably engage the underside of the base, the length of the hangers being such that the frame is maintained in downwardly flexed position about said cover portion when the clamp is in use.

ALEXANDER C. SLADKY.